United States Patent
Abe et al.

(10) Patent No.: US 7,777,389 B2
(45) Date of Patent: Aug. 17, 2010

(54) ROTATING ELECTRICAL MACHINE

(75) Inventors: Teruyoshi Abe, Hitachi (JP); Motoya Ito, Hitachinaka (JP); Fumio Tajima, Hitachi (JP); Yoshihisa Ishikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 11/776,579

(22) Filed: Jul. 12, 2007

(65) Prior Publication Data

US 2008/0012445 A1      Jan. 17, 2008

(30) Foreign Application Priority Data

Jul. 13, 2006   (JP)   .............................. 2006-192286

(51) Int. Cl.
*H02K 1/06*   (2006.01)
(52) U.S. Cl. .............................. 310/216.111; 310/261.4
(58) Field of Classification Search .......... 310/216.001, 310/216.004, 216.111, 45, 217–218, 258–259
See application file for complete search history.

(56) References Cited

U.S. PATENT DOCUMENTS

| | | | |
|---|---|---|---|
| 6,917,134 B2 * | 7/2005 | Hirama et al. | 310/216.008 |
| 6,979,930 B2 * | 12/2005 | Harada et al. | 310/216.004 |
| 2002/0145359 A1 * | 10/2002 | Nishiyama et al. | 310/218 |
| 2003/0020357 A1 * | 1/2003 | Harada et al. | 310/216 |
| 2003/0075996 A1 * | 4/2003 | Yoshida et al. | 310/58 |
| 2004/0124733 A1 * | 7/2004 | Yamamoto et al. | 310/218 |
| 2006/0125340 A1 * | 6/2006 | Nishiyama et al. | 310/218 |
| 2006/0290228 A1 | 12/2006 | Fujita et al. | |
| 2007/0013255 A1 * | 1/2007 | Wakitani et al. | 310/216 |
| 2008/0012445 A1 * | 1/2008 | Abe et al. | 310/217 |

FOREIGN PATENT DOCUMENTS

| | | |
|---|---|---|
| CN | 2604816 Y | 2/2004 |
| JP | 62-229921 | 10/1987 |
| JP | 05-284697 | 10/1993 |
| JP | 08-162335 | 6/1996 |
| JP | 09-117083 | 5/1997 |
| JP | 09-275007 | 10/1997 |
| JP | 11-155263 | 6/1999 |
| JP | 11-293422 | 10/1999 |

(Continued)

OTHER PUBLICATIONS

Chinese Office Action dated Jul. 24, 2009, issued in corresponding Chinese Patent Application No. 200710129080.0.

(Continued)

*Primary Examiner*—Thanh Lam
(74) *Attorney, Agent, or Firm*—Antonelli, Terry, Stout & Kraus, LLP.

(57) ABSTRACT

A rotating electrical machine comprises a stator and a rotor; the stator comprising a stator core having teeth and slots, and stator windings disposed in the slots, wherein the stator core is made of laminated steel sheets, teeth and slots of the steel sheet are made by etching, and the thickness of the steel sheet is between 0.05 mm and 0.30 mm. Specifically, it is preferable that the steel sheet used herein be a silicon steel sheet containing crystalline particles.

15 Claims, 8 Drawing Sheets

FOREIGN PATENT DOCUMENTS

| | | |
|---|---|---|
| JP | 2000-081030 A | 3/2000 |
| JP | 2000-197320 | 7/2000 |
| JP | 2001-025181 A | 1/2001 |
| JP | 2001-054256 A | 2/2001 |
| JP | 2002-078296 | 3/2002 |
| JP | 2002-078296 A | 3/2002 |
| JP | 2002-141238 A | 5/2002 |
| JP | 2003-129197 A | 5/2003 |
| JP | 2004-201428 | 7/2004 |
| JP | 2004-281737 | 10/2004 |
| JP | 2005-160231 | 6/2005 |
| JP | 2005-300211 | 10/2005 |
| RO | 118 507 B | 5/2003 |

OTHER PUBLICATIONS

European Search Report dated Mar. 9, 2010, issued in corresponding European Patent Application No. 07013385.

* cited by examiner

ROTATING ELECTRICAL MACHINE

CLAIM OF PRIORITY

The present application claims priority from Japanese application serial no. 2006-192286, filed on Jul. 13, 2006, the content of which is hereby incorporated by reference into this application.

FIELD OF THE INVENTION

The present invention relates to a rotating electrical machine which uses laminated electromagnetic steel sheets.

BACKGROUND OF THE INVENTION

A rotating electric motor is one example of a rotating electrical machine. The efficiency in a rotating electric motor has improved significantly because a synchronous electric motor having a rotor equipped with a permanent magnet is used.

However, it is desirable that the efficiency be further improved. A cause of decreased efficiency in a rotating electrical machine is iron loss in the stator core of the stator used in a rotating electrical machine. It is desirable that the iron loss should be reduced to provide a rotating electrical machine which is highly efficient.

For example, technique for reducing iron loss is described in patent document 1. The technique disclosed therein is technique that prevents the increase in iron loss generated due to the stress applied to a stator core as the result of the stator core being inserted into a housing by pressure; that is, the technique suppresses the generation of stress by creating a gap between the stator core and the housing, thereby preventing the increase in iron loss.

Furthermore, documents which describe the etching of a magnetic body include patent document 2, patent document 3, patent document 4, patent document 5, patent document 6, patent document 7, patent document 8, patent document 9, and patent document 10.

[Patent document 1] Japanese Patent Laid-open Publication No. 2004-201428

[Patent document 2] Japanese Patent Laid-open Publication No. 2000-197320

[Patent document 3] Japanese Patent Laid-open Publication No. 2004-281737

[Patent document 4] Japanese Patent Laid-open Publication No. 2005-300211

[Patent document 5] Japanese Patent Laid-open Publication No. 2002-078296

[Patent document 6] Japanese Patent Laid-open Publication No. 2005-160231

[Patent document 7] Japanese Patent Laid-open Publication No. Hei 11-155263

[Patent document 8] Japanese Patent Laid-open Publication No. Hei 09-117083

[Patent document 9] Japanese Patent Laid-open Publication No. Hei 05-284697

[Patent document 10] Japanese Patent Laid-open Publication No. Hei 09-275007

SUMMARY OF THE INVENTION

Iron loss can be expressed as the sum of hysteresis loss and eddy-current loss.

Hysteresis loss is loss that occurs when the magnetic domain of a magnetic core changes its direction due to an alternating magnetic field, and the hysteresis loss depends on the area of the inside of the hysteresis curve.

The stator core of the stator of a rotating electrical machine is made of laminated thin electromagnetic steel sheets to form a magnetic circuit in order to reduce eddy-current loss.

Furthermore, the stator core has a complicated shape having teeth and slots, and in the current circumstances, stator cores are made by a punching method. Punching deforms the crystalline structure of the cut section of the electromagnetic steel sheet, which decreases magnetic property and increase the area of the inside of the hysteresis curve, thereby increasing iron loss. As a result, there is a problem in that efficiency in a rotating electrical machine cannot be improved.

The purpose of the present invention is to provide a rotating electrical machine which can reduce iron loss.

The main embodiment of the present invention etches a steel sheet and reduces the thickness of the steel sheet to 0.30 mm or less in order to prevent deterioration of magnetic property caused by a punching method and further increase magnetic property.

Specifically, an embodiment of the present invention etches a silicon steel sheet which is one kind of thin electromagnetic steel sheets whose thickness is 0.30 mm or less thereby increasing magnetic property.

A rotating electrical machine described herein is equipped with a stator and a rotor, and the stator comprises a stator core, having teeth and slots, and stator windings located in the slots. The stator core is made of laminated steel sheets, and teeth and slots of the steel sheets are created by an etching method. Herein, the thickness of the steel sheet is between 0.08 mm and 0.30 mm, and preferably between 0.10 mm and 0.25 mm. Furthermore, the lower limit of the acceptable range is 0.05 mm.

Furthermore, if the laminated core density (%) of the stator core is defined as the thickness of the steel product (steel sheet) (mm)×the number of sheets÷the height of the core (mm)×100, it is preferable that the density of the laminated core be between 90.0% and 99.9%.

According to the present invention, it is possible to provide a rotating electrical machine which can reduce iron loss.

DESCRIPTION OF THE PREFERRED EMBODIMENTS

Figure 1:
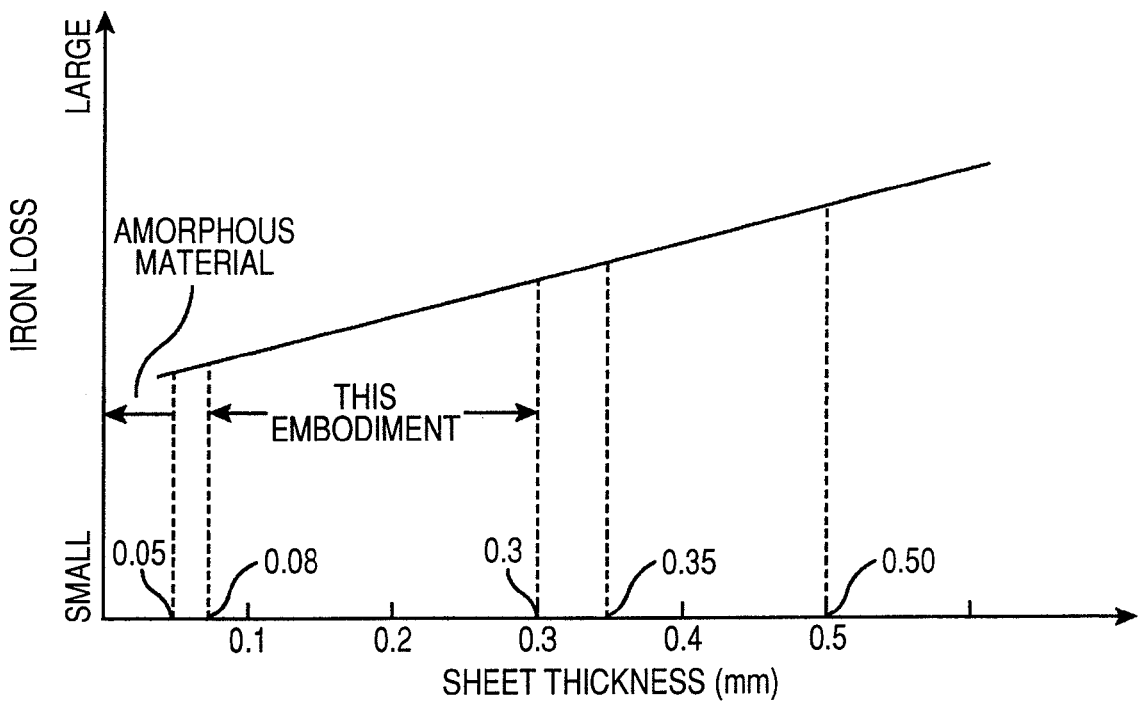
FIG. 1 shows the relation between the thickness of the electromagnetic steel sheet and iron loss.

One of two rotating electrical machines described in this embodiment is an induction motor and the other is a synchronous motor equipped with a permanent magnet. Each of the two motors has a stator and a rotor, and the stator comprises a stator core, having teeth and slots, and stator windings disposed in the slots. The stator core (hereafter sometimes referred to as "core") is made of laminated steel sheets, and the steel sheet's teeth and slots are made by etching, preferably by photo-etching. Herein, the thickness of the steel sheet is between 0.08 mm and 0.30 mm.

Of course, it is desirable that the entire stator core be etched from the viewpoint of improving magnetic property and the workability of the entire production process.

Furthermore, with regard to a rotor core, in the same manner as a stator core, it is desirable that a silicon steel sheet having thickness between 0.08 mm and 0.30 mm be etched from the viewpoint of the improvement of magnetic property. That is, producing a stator core or a rotor core by a punching method destroys the orderly crystalline structure in a steel sheet, thereby increasing hysteresis loss. By making a stator core or a rotor core by an etching method, it is possible to prevent the orderly crystalline structure from being destroyed, thereby preventing the increase of hysteresis loss.

The punching procedure tends to further destroy the cut section of a steel sheet, which is the object to be punched, as the steel sheet becomes thinner, and for example, crush, burrs, and shear drop become major problems which tend to increase hysteresis loss.

Furthermore, the forms that can be made by a punching method are usually simple forms such as a circle or a straight line. The reason for that is the punching method requires a die, and it is significantly difficult to create a die having a complicated curve. Furthermore, when polishing a die having a complicated curve, it is not possible to polish the die well, which is a problem.

Therefore, in mechanical machining methods such as a punching method, although it is possible to create a thin electromagnetic steel sheet to reduce eddy-current loss, this increases hysteresis loss; consequently, it is difficult to suppress iron loss.

The use of an etching method can solve this kind of problem. The etching method can suppress hysteresis loss and reduce eddy-current loss. With regard to a rotating electrical machine, it is possible to further increase the efficiency in the entire rotating electrical machine by etching a stator core and a rotor core. Moreover, the representative etching methods includes a photo-etching method.

By the use of the etching method, hysteresis loss can be reduced as the result of preventing the destruction of the orderly crystalline structure within the steel sheet, and also it is expected that characteristics of a rotating electrical machine can be improved as the result of significant increase in machining accuracy.

For example, in an induction motor, production accuracy of a stator and/or a rotor is increased, which reduces a magnetic gap between the stator and the rotor. This can increase the power factor thereby reducing reactive power. Furthermore, since it is possible to accurately machine the width of the magnetic gap, it is possible to increase characteristics and efficiency in a rotating electrical machine as the result of the reduction of torque pulsation or harmonic magnetic flux or the reduction of magnetoresistance or magnetic flux leakage.

Furthermore, since it is possible to machine a stator core or a rotor core with a complicated curve shape that leads to the improvement of characteristics and performance, when compared to the punching method, characteristics and performance of the rotating electrical machine can be further improved.

Not only in an induction electric motor, but also in a synchronous rotating electrical machine, by making a stator core or a rotor core by an etching method, it is possible to reduce iron loss, increase machining accuracy, and machine a complicated curve shape; thus, it is possible to improve characteristics and performance of a rotating electrical machine.

For example, by accurately machining the shape of a gap between a stator core and a rotor core, it is possible to reduce pulsation and increase efficiency, thereby making it possible to increase performance and improve characteristics of a rotating electrical machine.

Furthermore, in a synchronous rotating electrical machine with a built-in magnet, by creating a magnet loading port of a rotor made of laminated steel sheets by an etching method, it is possible to accurately create the shape of the magnet loading port, thereby reducing imbalance between the rotor's magnetic poles. Furthermore, since the shape of the magnetic pathway can be created accurately, it is possible to improve characteristics of the rotating electrical machine.

In such a case, it is possible to accurately etch a complicated curve shape which is not possible by a punching method; therefore, it becomes possible to improve characteristics and performance of a rotating electrical machine.

It is preferable that an induction motor or a synchronous motor have a three-phase winding for the stator winding. The use of a three-phase winding will increase efficiency in a rotating electrical machine and the use of the etching method will further increase the efficiency in the entire rotating electrical machine.

In an induction motor or a synchronous motor, it is possible to increase performance and improve characteristics as the result of the increase in machining accuracy in addition to the reduction of iron loss.

Specific descriptions will be provided in the following embodiments.

In this embodiment, the density of the laminated core is between 90.0% and 99.9%, preferably between 93.0% and 99.9%.

Moreover, it is not exactly impossible to improve the density of the laminated core by compressing the mechanically laminated core. However, in that case, iron loss increases, which is not preferable. What is described in this embodiment can improve the density of the laminated core without the necessity of a special process to improve the density of the laminated core.

In this case, the density (%) of the laminated core mentioned above is given by the thickness of the steel sheet ranging between 0.08 mm and 0.30 mm, the number of sheets constituting the core between 20 and 1000, and the height of the core between 5 mm and 200 mm.

Composition of the steel sheet is as follows: C is between 0.001% and 0.060% by weight, Mn is between 0.1% and 0.6% by weight, P is 0.03% or less by weight, S is 0.03% or less by weight, Cr is 0.1% or less by weight, Al is 0.8% or less by weight, Si is between 0.5% and 7.0% by weight, and Cu is between 0.01% and 0.20% by weight; and the remaining components consist of unavoidable impurities and Fe. Moreover, unavoidable impurities include oxygen and nitrogen gas components.

And, what is preferable is a silicon steel sheet that contains crystalline particles and functions as an electromagnetic steel sheet the composition of which is as follows: C is between 0.002% and 0.020% by weight, Mn is between 0.1% and 0.3% by weight, P is 0.02% or less by weight, S is 0.02% or less by weight, Cr is 0.05% or less by weight, Al is 0.5% or less by weight, Si is between 0.8% and 6.5% by weight, Cu is between 0.01% and 0.1% by weight; and the remaining components consist of impurities and Fe.

When determining the composition of such a silicon steel sheet, specifically from the viewpoint of reducing iron loss, contents of Si and Al are important. When Al/Si is prescribed from that viewpoint, it is preferable that the ratio be between 0.01 and 0.60; more preferably between 0.01 and 0.20.

Moreover, it is possible to select the concentration of silicon for the silicon steel sheet according to the type of the rotating electrical machine; for example, 0.8 to 2.0% by weight for one rotating electrical machine, and 4.5 to 6.5% by weight for a different rotating electrical machine.

Moreover, by decreasing the silicon content, magnetic flux density of the silicon steel sheet is improved. In this embodiment, 1.8 to 2.2 T is possible.

When the silicon content is small, rolling work property increases and the thickness of the sheet can be reduced; and by reducing the thickness of the sheet, iron loss decreases. On the other hand, when the silicon content is large, the problem of decrease in rolling work property can be solved by including silicon after the rolling process has finished; consequently, iron loss decreases.

Furthermore, silicon contained in the silicon steel sheet can be almost equally distributed in the thickness direction of the silicon steel sheet; and it is also possible to partially increase silicon concentration, for example, by making silicon concentration around the surface portion higher than the silicon concentration inside with respect to the thickness direction of the silicon steel sheet.

Furthermore, the core has an insulation film with a thickness between 0.01 μm and 0.2 μm interposed between two laminated steel sheets, and the thickness of the insulation film can be selected according to the type of the rotating electrical machine, for example, 0.1 to 0.2 μm, preferably 0.12 to 0.18 μm thick film for one rotating electrical machine, and 0.01 to 0.05 μm, preferably 0.02 to 0.04 μm thick film for a different rotating electrical machine.

Moreover, when the thickness of the insulation film is between 0.1 μm and 0.2 μm, it is preferable that an organic or inorganic film be used for the insulation film. Usable materials for the insulation film include organic materials, inorganic materials, and hybrid materials which combine those materials.

Furthermore, when the thickness of the insulation film is between 0.01 μm and 0.05 μm, it is preferable that the insulation film be an oxide film. Specifically, an iron-based oxide film is preferable.

That is, by reducing the thickness of the silicon steel sheet, it is also possible to decrease the thickness of the insulation film.

With regard to an insulation film of a conventional electromagnetic steel sheet, in order to improve punching work property itself as well as maintain good insulation property after the punching procedure, the thickness and components of the insulation film are determined by considering lubricating property, adhesiveness of the steel sheet, heat resistance against annealing after the punching process has been finished, and welding property in creating a core by welding the laminated electromagnetic steel sheets in addition to the insulation property; and the thickness of 0.3 μm is required.

However, with regard to the thin silicon steel sheet described in this embodiment, it was found that the thickness of the insulation film needs to be reduced.

The reason is as follows: when an insulation film as thin as a conventional insulation film is used, because the thickness of the silicon steel sheet is reduced, the volume ratio of the insulation film relatively increases more than the volume ratio of the silicon steel sheet; consequently, there is a possibility that magnetic flux density may decrease.

Thus, in a thin silicon steel sheet described in this embodiment, it is possible to reduce the thickness of the insulation film.

Generally, when making an electromagnetic steel sheet thin, it is necessary to make the insulation film thick. However, in this embodiment, unlike such concept, it is not necessary to make the insulation film thick even if the electromagnetic steel sheet is made thin; rather, both the insulation film and the electromagnetic steel sheet can be made thin. Therefore, the density of the laminated core can be increased.

Furthermore, a rotating electrical machine described herein functions as, so to called, a rotating electric motor which rotates by means of a rotating torque generated by alternating current flowing through a stator winding.

Herein, to function as a rotating electric motor, it is preferable that three-phase alternating current run through the stator winding.

Moreover, rotating electric motors include, for example, a spindle motor used for the hard disk, a vehicle drive motor used for the hybrid electrical car, an automobile's power steering motor, a train drive motor, and an elevator drive motor.

Furthermore, a rotating electrical machine described herein functions as a generator which outputs alternating current from the stator winding as the result of the rotor being turned by externally applied rotating torque thereby inducing alternating-current power in the stator winding.

Herein, to function as a generator, it is preferable that three-phase alternating current power be induced in the stator winding and three-phase alternating current be outputted from the stator winding.

A rotating electrical machine described herein can preferably apply to a small or medium size rotating electrical machine which has a core with a diameter of between 5 mm and 300 mm and maximum output of 200 kW or less. Those rotating electrical machines include the ones used for constant speed operation or the ones used for variable speed operation.

Moreover, it is possible to use one rotating electrical machine so that it can functions both as a rotating electric motor and a generator. In such a case, it is preferable that the maximum output be greater when the machine is used as a rotating electric motor than the maximum output when used as a generator; the rotating electric motor being between 50 kW and 200 kW and the generator being between 25 kW and 100 kW.

Furthermore, it is preferable that a rotating electrical machine described in this embodiment apply to a rotating electrical machine whose driving range at a maximum rotation speed is between 4000 rpm and 100,000 rpm.

And, it is necessary to determine the specifications of a rotating electrical machine by considering the distribution condition of silicon in the silicon steel sheet as well as taking into consideration the conditions under which the rotor will be used. It is possible to selectively use the rotating electrical machine in a case when the driving range at maximum rotation speed is between 4000 rpm and 6000 rpm and silicon contained in a silicon steel sheet is distributed in the thickness direction of the steel sheet, and in a case when the driving range at maximum rotation speed is between 10,000 rpm and 100,000 rpm and the concentration of silicon contained in the surface portion of the silicon steel sheet is higher than that of silicon in the inside of the sheet.

The relation between the rotation speed and iron loss is such that as the rotation speed increases, alternate frequency of magnetic flux increases thereby increasing iron loss. Iron loss in a rotating electrical machine that rotates at high speed tends to increase when compared to iron loss in a rotating electrical machine that rotates at low speed. By taking into consideration this point, it is necessary to determine the silicon content in the silicon steel sheet.

Moreover, it is possible to equally add silicon contained in a silicon steel sheet to an electromagnetic steel sheet by a solution process. It is also possible to locally add silicon to an electromagnetic steel sheet, specifically to the surface portion, by the surface modification, ion implantation, or the CVD (chemical vapor deposition) method.

Furthermore, it is assumed that an electromagnetic steel sheet described in this embodiment be used for a core having teeth and slots which constitute a stator of a rotating electrical machine, and the thickness of the electromagnetic steel sheet should be between 0.08 mm and 0.30 mm, and teeth and slots can be created by an etching method.

Etching an electromagnetic steel sheet having a width between 50 cm and 200 cm is conducted as follows: resist is applied to a steel sheet, the shapes of teeth and slots are exposed on the steel sheet and developed, and the resist is removed according to the shapes, then the steel sheet is machined by using etching liquid, and after the machining process has been finished, the remaining resist is removed.

Small and medium size rotating electrical machines have become more efficient and of high performance as the result of the use of an inverter, the application of rare earth magnets, and the progress of optimal design. However, to achieve further efficiency and higher performance, new material technology is necessary. With regard to the electromagnetic steel sheet which is a core material, materials having high magnetic flux density and low iron loss as typified by the silicon steel sheet have been studied and developed.

Furthermore, because the silicon steel sheet's rolling work property is low and also punching work property when the core is punched is low, it has been considered impossible to reduce the thickness of the silicon steel sheet so as to reduce iron loss on an industrial scale without significantly increasing costs. Thus, when silicon steel sheets are applied to the electromagnetic steel sheets used for a high-efficiency, high-performance small-or-medium-size rotating electrical machine, the sheet is mainly 0.50 mm thick or 0.35 mm thick; the sheet has not been made thinner for a long period of time.

However, in this embodiment, by using an etching method instead of using a punching method, it is possible to reduce the thickness of the silicon steel sheet used for a core on an industrial scale without significantly increasing costs, thereby reducing iron loss.

In this embodiment, in order to reduce iron loss in the core, silicon steel sheets having small iron loss are used, silicon content is determined by considering the rolling procedure, the thickness of the silicon steel sheet is reduced by considering the rolling work of the sheet, the etching process is applied to the creation of the shape of the core, iron loss in each silicon steel sheet that constitutes a laminated core is reduced, and iron loss in the core is reduced by considering the insulation film created between a single silicon steel sheet and another single silicon steel sheet.

In the punching method that performs punching work by using a die, a work hardened layer and a plastic deformation layer, such as burrs and shear drops (hereafter referred to as "burr"), are created around the cut section, and residual strain or residual stress occurs. Residual stress that occurs during the punching process destroys the regularity of the array of molecular magnets, which means it destroys magnetic domain, significantly increases iron loss, and an annealing process is necessary to remove residual stress. The annealing process results in further increase in core production costs.

In this embodiment, because a core is created without applying the punching work, a plastic deformation layer is rarely created, which will not cause residual strain or residual stress. Therefore, the array of crystalline particles is almost never disturbed, and it is possible to prevent damage to the array of molecular magnets, which is the array of the magnetic domain, there by making it possible to prevent hysteresis characteristic, which is the magnetic property, from deteriorating.

Furthermore, the core is created by laminating machined silicon steel sheets. By suppressing the occurrence of residual strain or residual stress in those silicon steel sheets, it is possible to further improve the magnetic property of the core.

Therefore, a rotating electrical machine according to this embodiment can reduce iron loss, create high output, and be small with a light-weight body. Furthermore, electromagnetic steel sheets used for the rotating electrical machine are good sheets that have few burrs around the edges.

Burrs which are kinds of plastic deformation layers sharply protrude outward in the plane direction of the steel sheet along the cut section; therefore, burrs damage an insulation film formed on the surface of the electromagnetic steel sheet, and in some cases, burrs destroy insulation between individual laminated steel sheets.

Furthermore, when laminating such steel sheets, burrs create an unnecessary gap between laminated steel sheets; therefore, the increase of laminated core density is inhibited, resulting in the reduction of the magnetic flux density. Decreased magnetic flux density inhibits the ability to achieve a small and light-weight rotating electrical machine.

There is a method in which the core is compressed in the thickness direction of the sheet after electromagnetic steel sheets have been laminated so as to eliminate burrs thereby increasing the density of the laminated core. However, in this case, residual stress increases due to the compression by pressure, resulting in the increase in iron loss. Furthermore, a problem remains in that burrs may destroy insulation.

Because burrs almost never occur on the core described in this embodiment, it is possible to increase the density of the laminated core without compressing the core by pressure, and furthermore, insulation will not be destroyed. As a result, iron loss can be reduced as well.

With regard to a silicon steel sheet which is an electromagnetic steel sheet used for the core, when the silicon content is 6.5% by weight, theoretically, iron loss is the lowest. However, when the silicon content increases, rolling work property and punching work property significantly deteriorate. For this reason, even if iron loss is high to some extent, usually, silicon content in the silicon steel sheet is determined to be about 3.0% by weight by considering rolling work property and punching work property.

A silicon steel sheet described in this embodiment can be made thin; 0.3 mm thick or less. Therefore, even if silicon content is 2.0% or less by weight, iron loss is low.

Conventionally, a special process, such as a rolling process, annealing process, etc., is necessary for producing a thin silicon steel sheet with a thickness of 0.3 mm or less. Since the silicon steel sheet described in this embodiment does not require such a special process, costs of production of thin silicon steel sheets can be reduced. Moreover, because punching work is not necessary for producing the core, it is possible to further reduce production costs.

Other than a silicon steel sheet used as the main material of a core, there is an extremely expensive amorphous material which has been used as an ultrathin electromagnetic material in a limited way for special purposes. Because this amorphous material requires a special process for quickly solidifying molten metal to produce foil, it is possible to produce an extremely small amount of ultrathin sheets having a thickness of 0.05 mm or less and a width of 300 mm; however, it is considered impossible to produce amorphous material for thicker and wider sheets on an industrial scale.

As stated above, since amorphous material is hard, brittle, and too thin, punching work cannot apply to the amorphous material. Also, because of low magnetic flux density due to the limitation of chemical components, amorphous material cannot be the main material for the core.

Unlike such amorphous material, the electromagnetic steel sheet described in this embodiment includes crystalline particles.

Furthermore, electromagnetic steel sheets used in this embodiment can achieve the reduction of the thickness of the sheet, the reduction of strain, and the creation of high output to help reduce iron loss; the improvement of dimensional accuracy so as to realize a small and light-weight body; and the increase in the laminated core density so as to help increase the magnetic flux density.

That is, according to this embodiment, it is possible to provide a core which can achieve high output and a small and light-weight body as well as low iron loss.

FIG. 1 shows a relation between the thickness of an electromagnetic steel sheet and iron loss.

As FIG. 1 shows, there is a relation between the thickness of an electromagnetic steel sheet and iron loss in that as the sheet becomes thicker the iron loss increases.

Two kinds of silicon steel sheets with different thickness are usually used by considering the rolling work property and punching work property: 0.50 mm and 0.35 mm.

It is necessary to provide the rolling and annealing processes to use those two types of silicon steel sheets with different thickness for producing the core in order to reduce iron loss. Furthermore, to further reduce the thickness of the sheet, it is necessary to repeat the rolling and annealing processes although the number of repetitions differs according to the shape and the size of the core to be created. Thus, with regard to generally used silicon steel sheets, it is necessary to add special processes, such as rolling and annealing processes, to the production process in order to reduce the thickness of the sheet; consequently, production costs increase.

The core described in this embodiment can reduce production costs and solve the problem in machining the core; therefore, mass production on an industrial scale becomes possible.

In this embodiment, a silicon steel sheet with a thickness between 0.08 mm and 0.30 mm is used. Moreover, it is preferable that the silicon steel sheet with a thickness between 0.1 mm and 0.2 mm be used and the shape of the core be created by etching.

For reference, FIG. 1 also shows the range of the thickness of a sheet made of amorphous material. Because amorphous material requires a special process to rapidly solidify molten metal to produce foil, it is suitable for the production of ultrathin sheets with a thickness of 0.05 mm or less, and it is difficult to produce thicker sheets because rapid cooling is not possible. Furthermore, only narrow sheets with a width of about 300 mm can be produced and a special production process is necessary; consequently, production costs are significantly high.

Furthermore, with respect to magnetic property, although iron loss is low, magnetic flux density is low as well; this is a weak point. This is because chemical components are limited due to rapid solidification.

In this embodiment, without using such amorphous material, silicon steel sheets containing crystalline particles are used.

Next, a typical silicon steel sheet production process will be described.

Material that can be used as electromagnetic steel sheets is manufactured. For example, steel sheet material that contains C (0.005% by weight), Mn (0.2% by weight), P (0.02% by weight), S (0.02% by weight), Cr (0.03% by weight), Al (0.03% by weight), Si (2.0% by weight), and Cu (0.01% by weight), with the remaining components consisting of Fe and a few impurities.

Applying continuous casting, hot rolling, continuous annealing, acid pickling, cold rolling, and continuous annealing processes to such steel sheet material, a silicon steel sheet having a width between 50 cm and 200 cm, specifically 50 cm herein, and a thickness of 0.2 mm is produced.

Furthermore, to reduce iron loss, it is possible to apply silicon that is between 4.5% and 6.5% by weight on the surface of the created silicon steel sheet.

After that, a 0.1 μm thick insulation film made of organic resin is applied as a coating, thereby producing a silicon steel sheet.

Depending on circumstances, without using the process to apply a special insulation film as a coating, it is possible to create an oxide film having a thickness between 0.01 μm and 0.05 μm.

Moreover, when producing a core, it is preferable that the process to apply an insulation film as a coating described herein be executed after the etching process has been finished.

Moreover, a silicon steel sheet is shaped as a flat sheet, coil, or roll.

Next, the typical core production process will be described.

Pretreatment is applied to the produced silicon steel sheet and then resist is applied to the sheet. Onto the resist, the shapes of teeth and slots are exposed by using a mask, and then developed. Subsequently, resist is removed according to the shapes. Furthermore, machining is conducted by using etching liquid. After that, remaining resist is removed, and finally, a silicon steel sheet with desired shapes of teeth and slots is produced. For example, a photo-etching method is effective for such production, and it is also effective to use a method for precisely machining pores by using a metal mask.

A plurality of silicon steel sheets each of which has the desired shapes of teeth, slots and a core are laminated, and then those laminated silicon steel sheets are joined by means of welding, thereby producing the core. Moreover, in welding, it is preferable that a welding process with little heat input, such as fiber laser, be used.

Moreover, it is also possible to simultaneously obtain a rotor core and a stator core from a flat, coiled, or rolled silicon steel sheet; thus, cores with a plurality of shapes can be simultaneously obtained.

By producing the shapes of teeth and slots by means of etching, it is possible to produce the desired shapes of teeth and slots with an extremely high machining accuracy, for example, with an error of ±10 μm or less, preferably, ±5 μm or less.

Furthermore, when expressing an error by using roundness, it is preferable that the error be 30 µm or less, more preferably, 15 µm or less, and further preferably, 10 µm or less. Moreover, roundness means deviation of a circular portion from a geometric circle, that is, a difference of the radius between two concentric geometric circles when a circular portion is sandwiched by the two concentric geometric circles and the area between the two concentric geometric circles is the smallest.

Furthermore, it is possible to simultaneously create the shape of a stator core having teeth and slots plus the shape of a rotor core by an etching method. In this case, because etching accuracy is high, the gap between the stator core and the rotor core can be between 0.1 mm and 0.5 mm.

Furthermore, in this embodiment, production of the stator core has been described. The rotor core can also be of a hollow construction at its central portion, and the rotor core's slots can also be of a complicated shape.

Figure 2:
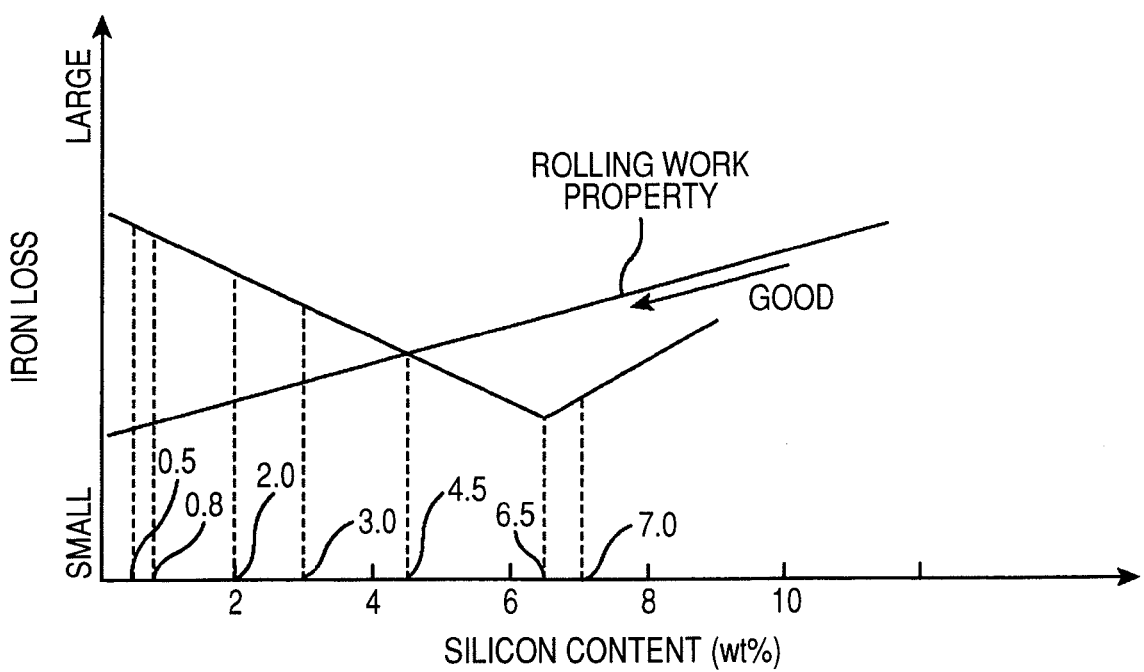
FIG. 2 shows the relation between the silicon content in the silicon steel sheet and iron loss.

FIG. 2 shows the relation between the silicon content and iron loss in the silicon steel sheet.

As shown in FIG. 2, a silicon steel sheet whose silicon content is 6.5% by weight has the least amount of iron loss. However, when a silicon steel sheet contains a large amount of silicon, 6.5% by weight, the rolling work is difficult to execute, thereby making it difficult to produce a silicon steel sheet with a desired thickness. This is because rolling work property tends to decrease as an electromagnetic steel sheet contains more silicon. Due to these circumstances, by considering the balance between iron loss and rolling work property, a silicon steel sheet whose silicon content is 3.0% by weight is usually used.

That is, in this embodiment, by reducing the thickness of the silicon steel sheet, iron loss in the silicon steel sheet is reduced, and consequently, the influence of silicon content in the silicon steel sheet on iron loss is reduced.

Therefore, rolling work property of the silicon steel sheet described in this embodiment is improved, and the freedom degree of the silicon content in the silicon steel sheet which greatly influences iron loss increases by reducing the thickness of the sheet. For those reasons, it is possible to determine the silicon content in the silicon steel sheet within the range between 0.5% and 7.0% by weight, and, it is also possible to use such significantly different contents as 0.8% to 2.0% by weight and 4.5% to 6.5% by weight. Thus, it is possible to selectively determine the silicon content according to the core specifications or the purpose of a rotating electrical machine.

Figure 3:
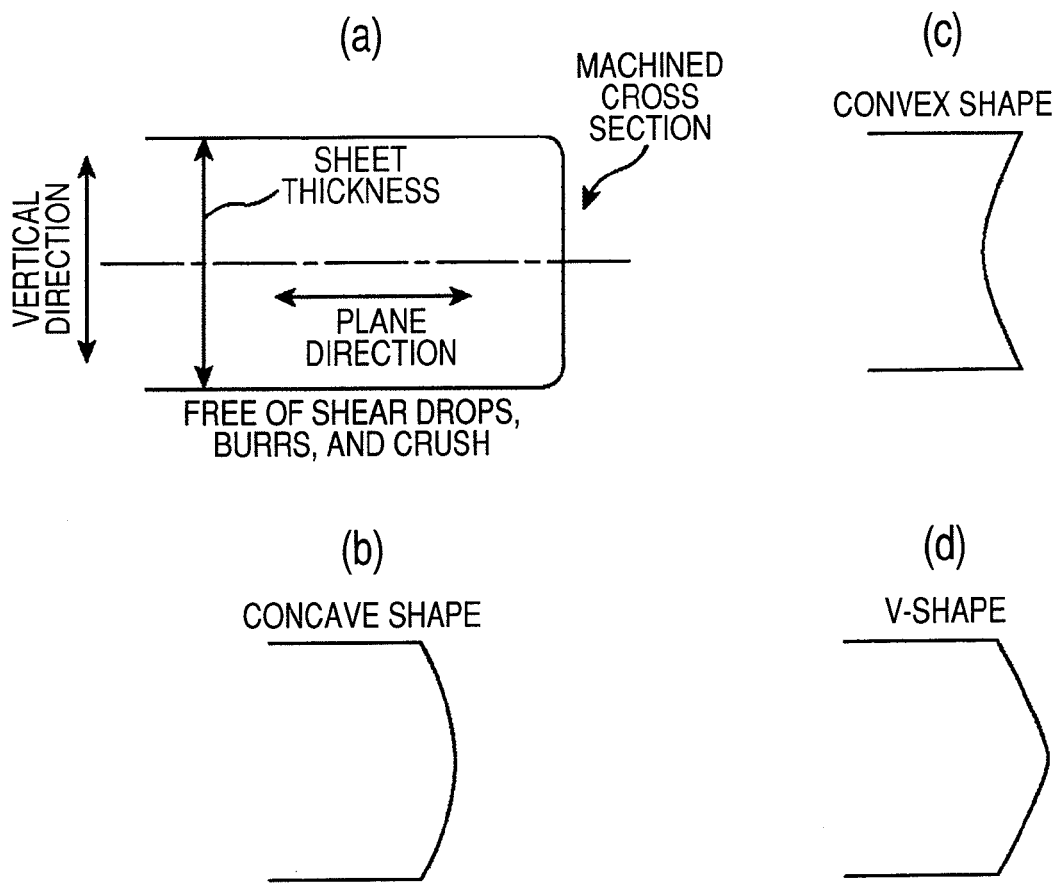
FIG. 3 shows the typical shape of the etched cross section.

FIG. 3 shows the typical etched cross section.

By etching a silicon steel sheet, there is no plastic deformation layer such as burrs, as shown in figure (a), around the machined cross section which has been dissolved by an acid solution. It is possible to create a machined cross section which is almost vertical to the plane direction of the silicon steel sheet.

Furthermore, by means of the state-of-the-art photo-etching, it is possible to control the shapes of the dissolved portion as shown in figures (b) to (d). That is, a specified taper can be created, and also, concave and convex shapes can be created vertically to the thickness direction of the steel sheet.

Thus, residual stress applied to the etched silicon steel sheet during the etching process is almost zero, almost no plastic deformation layer exists, and the amount of plastic deformation in the thickness direction of the silicon steel sheet is almost zero. Furthermore, the amount of plastic deformation around the etched cross section is almost zero.

Furthermore, in the etched cross section, it is possible to control the shape of the etched cross section of a silicon steel sheet, and it is also possible to create a cut cross section which has almost no residual stress applied during the etching process and almost no plastic deformation around the etched cross section.

Furthermore, by using the etching process, it is possible to optimize the microscopic crystalline structure of the silicon steel sheet, mechanical characteristics, and the surface portion condition and apply those properties to the core. It is also possible to optimize the core's magnetic property by considering the anisotropy of the crystalline structure of the silicon steel sheet and the anisotropy of magnetic property based on the anisotropy of the crystalline structure.

Figure 4:
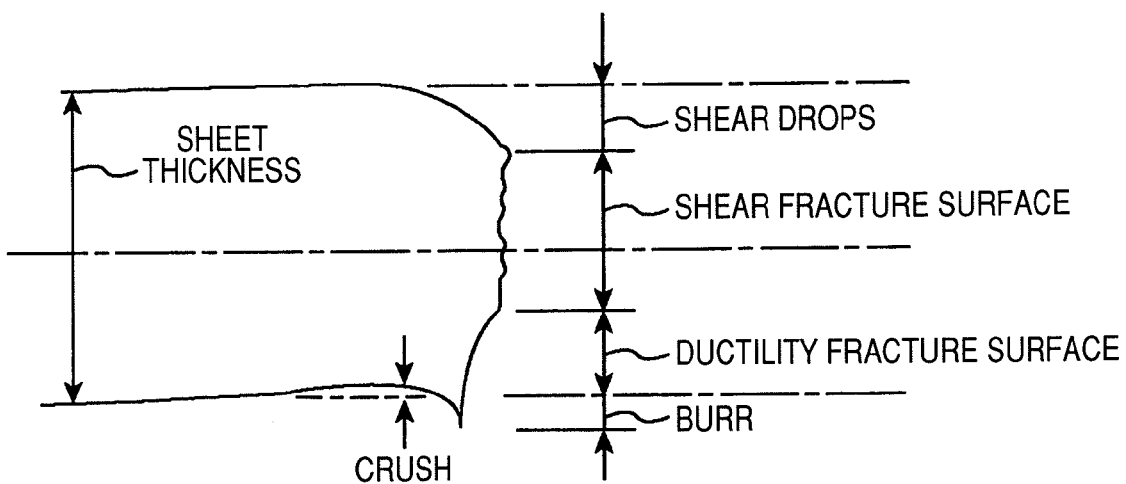
FIG. 4 shows the typical shape of the punched cross section.

FIG. 4 shows the shape of the typical punched cross section.

Punching a silicon steel sheet causes the vicinity of the punched cross section to greatly deform due to shear stress applied during the plastic forming process; consequently, burrs, shear drops, or crush between 10 µm and 100 µm are created.

Furthermore, in the punching method, dimensional accuracy in the plane direction of the silicon steel sheet is limited by a die's dimensional accuracy and the steel sheet is usually sheared with a gap of about 5% of the thickness of the silicon steel sheet; therefore, dimensional accuracy in the plane direction of the silicon steel sheet decreases. Furthermore, there is a problem with mass production in that accuracy temporarily decreases due to wear damage of a die. Furthermore, the thinner the silicon steel sheet, the more difficult it is to punch.

In this embodiment that applies etching work, this kind of machining accuracy problem is solved and the temporary decrease in accuracy is eliminated.

Furthermore, when exposing the shapes of teeth and slots by using specified patterns, it is preferable that a mark or a reference hole which indicates the rolling direction of the electromagnetic steel sheet be provided.

When laminating electromagnetic steel sheets, it is necessary to equalize an electromagnetic steel sheet in the rolling direction so as to improve characteristics of the rotating electrical machine. For example, it is possible to improve magnetic property of a rotating electrical machine by changing the specified quantity and the position of a mark or a reference hole with respect to the rolling direction and aligning the position of the mark or reference hole when laminating the electromagnetic steel sheets.

Figure 5:
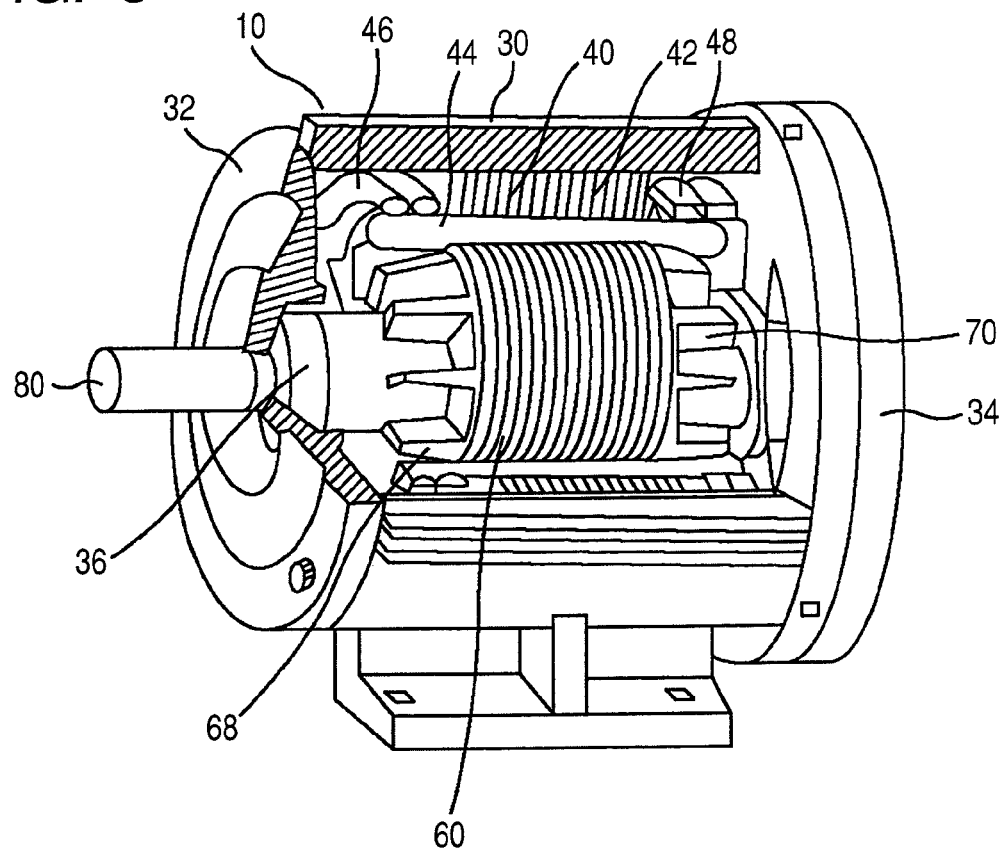
FIG. 5 shows the structure of a rotating electrical machine.

FIG. 5 shows the structure of a three-phase induction electric motor that uses electromagnetic steel sheets.

An induction electric motor 10 comprises a housing 30, an end bracket 32, a fan cover 34 that has a fan inside, a stator 40 fixed inside the housing 30, a rotor 60 disposed inside the stator 40, and a shaft 80 that supports the rotor 60.

The shaft 80 is rotatably supported by bearings 36 onto the end brackets 32 on both sides.

Furthermore, a fan fixed onto the shaft 80 is disposed inside the fan cover 34, and the fan rotates along with the shaft 80. Moreover, a fan-side end bracket 32, bearing 36, and a fan are located inside the fan cover 34, and they are not shown in FIG. 5.

A stator 40 comprises a stator core 42 and multi-phase, three-phase in this embodiment, stator windings 44 which are wound onto the stator core 42.

Furthermore, alternating current is supplied from an alternating current terminal, not shown, to stator windings 44 via each leading line 46, and the stator windings 44 have star connection or delta connection via a wire 48. The leading line 46 and the wire 48 are located outside the stator windings 44.

Three-phase alternating current is supplied from an external alternating-current power source to an alternating-current terminal of an induction electric motor 10 and then supplied to the stator winding 44 via the leading line 46, thereby the stator 40 generates a rotating magnetic field based on the frequency of alternating current. The rotating magnetic field induces rotor current to the conductor of the rotor 60, and the rotor current reacts with the rotating magnetic field thereby generating a rotating torque.

Figure 6:
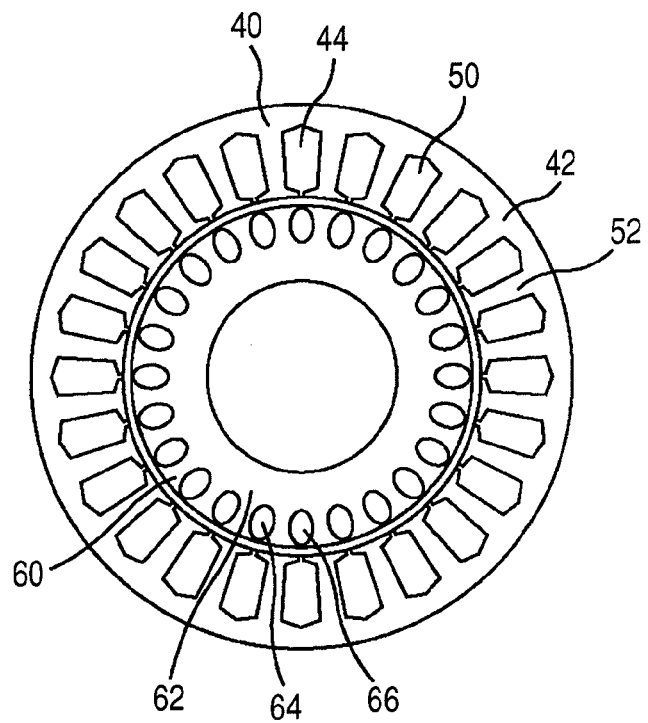
FIG. 6 shows the cross section of the core of a rotating electrical machine.

FIG. 6 shows the cut section of the stator 40 and the rotor 60, shown in FIG. 5, which are cut by a plane vertical to the rotational axis.

In FIG. 5 and FIG. 6, the stator 40 has many stator slots 50 in the circumferential direction at equal intervals, and a stator winding 44 is disposed in each stator slot 50.

A rotor 60 comprises a rotor core 62 made of laminated silicon steel sheets, rotor conductors 66 each of which is inserted into each rotor slot 64 created on the rotor core 62, and short-circuit rings 68 and 70 that electrically short-circuit the rotor conductors 66 disposed on both sides of the rotor core 62.

In this embodiment, the rotor slot 64 is created such that it penetrates the rotor core 62 and the rotor conductor 66 is disposed in the rotor slot 64 along the direction of the rotational axis.

As shown in this embodiment, the rotor slot 64 can be made such that it penetrates the inside of the rotor core 62, and also, the stator 40 side rotor slot 64 can have an opening instead of the rotor slot 64 being completely embedded in the inside of the rotor core 62.

Both sides of the rotor conductor 66 are electrically short-circuited by the short-circuit rings 68 and 70, and the rotating magnetic field induces voltage to the rotor conductor 66 which has been short-circuited by the short-circuit rings 68 and 70 thereby allowing current to flow. The current reacts with the rotating magnetic field thereby generating a rotating torque in the rotor 60.

The rotor core 62 is made of laminated silicon steel sheets fixed onto the shaft 80. In this embodiment, the thickness of each silicon steel sheet is thin, for example, between 0.08 mm and 0.03 mm. Furthermore, since those sheets are made by etching, it is possible to significantly reduce iron loss.

The rotor core 62 is created by etching, and the rotor slot 64 is also created simultaneously during the etching process. Rotor slots 64 are created at equal intervals on the outer-circumference of the rotor core 62 which is made of laminated silicon steel sheets, and because a rotor conductor 66 is inserted into each of rotor slots 64 disposed at equal intervals, the rotor conductors 66 are disposed at equal intervals in the circumferential direction of the rotor core 62.

The rotor conductor 66 can be made such that conductive material, for example, a conductor mainly made of copper, is inserted into the rotor slot 64 and both ends are electrically short-circuited by short-circuit rings. Furthermore, the conductor and the short-circuit rings can be made by an aluminum die-casting method.

The aluminum die-casting method is performed by putting the laminated rotor core 62 into a die and pouring molten aluminum into the die, thereby forming a rotor conductor 66 inside the rotor slot 64 of the rotor core 62 and also making short-circuit rings 68 and 70.

The advantage of the aluminum die-casting method is ease of production; however, the weak point is that because the rotor conductor 66 is made of aluminum, electric resistance is slightly large resulting in a large loss.

To compensate for this weak point, there is a method by which molten aluminum is poured into the inside of the rotor slot 64 in which a copper wire is inserted.

Furthermore, other than the aluminum die-casting method, there is a method in which a copper conductor bar is inserted into a rotor slot 64, and copper short-circuit rings are welded to a rotor conductor 66 so as to provide an electrical connection. This method can extremely reduce loss.

To reduce iron loss due to the occurrence of eddy current, the stator core 42 and the rotor core 62 are structured by laminating steel sheets.

Because eddy current is proportional to the frequency of magnetic flux change, it increases in proportion to the increase in the frequency of the rotating magnetic field. Furthermore, since the frequency of magnetic flux change becomes high as the number of poles of the stator 40 increases, eddy current increases in proportion to the increases in the number of poles. Therefore, eddy-current loss increases as the frequency of magnetic flux change or the number of poles increases.

Furthermore, because eddy-current loss increases according to the thickness of the sheet, eddy-current loss rapidly decreases as the sheet becomes thinner.

When an electromagnetic steel sheet to be machined becomes thin, punching work becomes difficult. Also, as an electromagnetic steel sheet becomes thin, damage to the magnetic domain of the core caused during the punching process rapidly increases. Eddy-current loss decreases as the sheet is made thinner, however, when using the punching work, damage to the magnetic domain increases, causing hysteresis loss to increase; consequently, a problem arises in that iron loss in a stator 40 or in a rotor 60 cannot be sufficiently reduced.

On the contrary, in this embodiment, because an electromagnetic steel sheet is etched, it is possible to prevent damage to the magnetic domain, thereby preventing the increase in hysteresis loss. Therefore, it is possible to sufficiently reduce iron loss in the stator 40 and in the rotor 60.

Furthermore, unlike punching work, workability of etching increases as an electromagnetic steel sheet to be etched becomes thinner.

Furthermore, it is advantageous that etching can be executed at extremely high accuracy when compared to the punching work, and a complicated shape can be accurately etched; therefore, it is possible to obtain characteristics which cannot be obtained by punching.

In this embodiment, each single electromagnetic steel sheet which forms a stator core 42 having stator teeth 52 and stator slots 50 and a rotor core 62 having rotor slots 64 is created by photo-etching from a silicon steel sheet with a thickness between 0.08 mm and 0.30 mm, and then the sheets will be laminated together.

It is preferable that the thickness of a silicon steel sheet be between 0.08 mm and 0.20 mm. By making a silicon steel sheet thin, it is possible to reduce eddy-current loss; and furthermore, by using the photo-etching method instead of using the punching method, it is possible to extremely reduce damage to the magnetic domain, thereby preventing the increase in hysteresis loss.

Furthermore, an advantage is that making a silicon steel sheet thin will improve productivity of etching work.

In this embodiment, because eddy-current loss can be reduced, it is possible to suppress eddy current in the stator core 42 and the rotor core 62 during high speed rotation in a high-speed rotating electrical machine, thereby reducing iron loss. Specifically, this is effective when maximum rotation speed of a rotor 60 is 4000 rpm or more. Great effect can be expected on a rotating electrical machine that is associated with the rotor 60 having a maximum rotation speed which is set above 4000 up to 6000 rpm. Furthermore, if the technical concept of this embodiment is applied to the rotating electrical machine that is equipped with the rotor 60 having a maximum rotation speed which is set from 6000 to 10,000 rpm, greater effect can be expected.

Moreover, if the technical concept of this embodiment is applied to a rotating electrical machine that rotates with short-circuit rings at the maximum rotation speed of the rotor 60, great effect can be expected. And if the technical concept of this embodiment is applied to a rotating electrical machine that is associated with the rotor 60 having a maximum rotation speed which is set from 10,000 to 100,000 rpm, greater effect can be expected.

In this embodiment, because a rotor core 62 and a stator core 42 are created by photo-etching, hysteresis loss can be reduced. In addition, by improving machining accuracy, it is possible to significantly reduce surface loss included in the iron loss.

The reduction of surface loss has been proposed in the Japan Examined Patent Publication (Published Examined Applications No. Sho 60-56058). However, by the use of a conventional machining method, for example, a cutting method by punching work, it is difficult to maintain high machining accuracy. Therefore, it is difficult to put the content described in the Japan Examined Patent Publication into practical use.

However, in this embodiment, because the stator core and the rotor core are made by an etching process, the above proposal can be achieved and effects that are described in FIG. 5 and FIG. 6 can be expected. Thus, due to the integrated effects, it is possible to provide a highly efficient rotating electrical machine.

Next, the reduction of surface loss included in iron loss will be described.

In a multi-phase alternating current rotating electrical machine, a three-phase alternating current rotating electrical machine in this embodiment, harmonic magnetic flux contained in magnetic flux from a stator causes surface loss to occur on a rotor. Specifically, in a basket-type induction electric motor, an extremely narrow gap between the stator core and the rotor core tends to increase surface loss.

In a basket-type induction electric motor, the ratio of surface loss to iron loss is relatively large, resulting in the decrease in efficiency in a basket-type induction electric motor.

Figure 7:
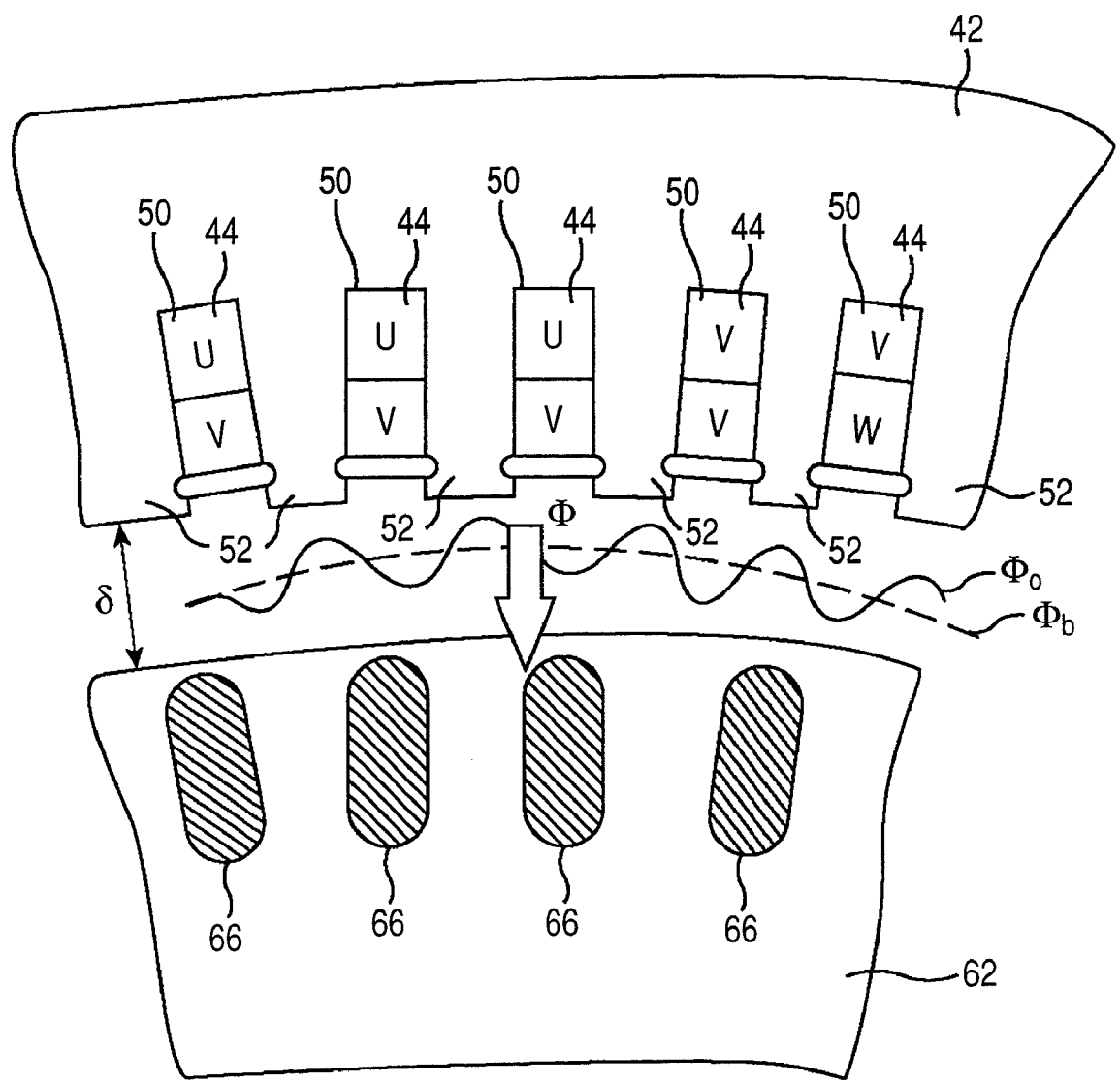
FIG. 7 shows the condition of magnetic flux in the gap between the stator and the rotor.

In FIG. 7, on the inner circumferential surface of the stator core 42, that is, the surface that faces the rotor core 62, stator slots 50 that extend toward the direction of the rotational axis are disposed in the circumferential direction at prescribed intervals. A three-phase stator winding 44 is incorporated into the inside of the stator slot 50, and a rotating magnetic field based on the frequency of three-phase alternating current supplied from the stator winding 44 is generated.

Moreover, each of stator teeth 52 is located between two stator slots 50 and functions as a magnetic pathway through which magnetic flux runs to or from the rotor 60.

Each of the stator teeth 52 has the same shape and has the same cross-sectional area.

FIG. 7 shows an example in which two sets of stator windings 44 are disposed in a stator slot 50 in the diameter direction. However, this is only an example, and more stator windings can be inserted.

In FIG. 7, "U," "V," and "W" indicate an U-phase, V-phase, and W-phase stator winding, respectively.

On the other hand, a rotor core 62 is positioned via a gap δ on the inner circumferential surface side of the stator core 42, and rotor conductors 66 are embedded in the vicinity of the surface of the rotor core 62 so that they extend in the direction of the rotational axis.

In a basket-type induction electric motor thus structured, when analyzing magnetic flux φ in a gap δ while the motor is operated, as shown in the drawing, it is found that fundamental harmonic magnetic flux φb which rotates the rotor and relatively small and pulsating, harmonic pulsation magnetic flux φ0 exist in the gap δ.

Moreover, those magnetic flux waveforms show average values.

Harmonic pulsation magnetic flux φ0 is mainly generated by permeance fluctuation between the stator and the rotor, or generated by irregularity of magnetomotive force that occurs because the stator winding 44 is inserted into the stator slot 50. The harmonic pulsation magnetic flux φ0 is an essentially unnecessary component.

When the harmonic pulsation magnetic flux φ0 enters the rotating rotor, it causes harmonic iron loss to occur in the rotor core 62 and also induces harmonic eddy current in the rotor conductor 66. As a result, harmonic eddy-current loss occurs. The harmonic iron loss and harmonic eddy-current loss result in surface loss.

Harmonic eddy-current loss is generated in the rotor conductor 66, specifically, in the rotor conductor 66 near the gap δ, and harmonic iron loss is generated in the rotor core 62 near the gap δ.

Herein, when the magnetic flux density of each part of the rotor originated from harmonic pulsation magnetic flux φ0 is denoted as Bh, and frequency of harmonic pulsation magnetic flux φ0 in the rotor, which is the frequency of harmonic pulsation magnetic flux φ0 in the rotor according to the coordination system when harmonic pulsation magnetic flux φ0 enters the rotor, is denoted as fn, Bh and fn will be expressed as described below.

For example, the number of stator slots is denoted as N5, and rotation speed of the rotor is denoted as n (rps). In this condition, frequency fn of harmonic pulsation magnetic flux φ0 that enters the rotor is expressed by fn=N5×n.

Herein, when using Bh that represents the rotor's magnetic flux density and fn that represents frequency of harmonic pulsation magnetic flux φ0 that enters the rotor, harmonic eddy-current loss We can be expressed by the following equation.

$$We \propto fn^2 \times Bh^2 \quad (1)$$

On the other hand, harmonic iron loss Wh can be divided into eddy-current loss Wie and hysteresis loss Wih. Eddy-current loss Wie is expressed by the same manner as the above equation (1), and hysteresis loss Wih is expressed by the following equation.

$$Wih \propto fn^{1-1.5} \times Bh^{1.5-2} \quad (2)$$

From those equations (1) and (2), it is found that both losses We and Wih rapidly increase as frequency fn of harmonic pulsation magnetic flux φ0 and the rotor's magnetic flux density Bh increase.

By observing high-frequency pulsation magnetic flux φ0 which is a problem, it was found that the harmonic pulsation magnetic flux φ0 is based on the number of stator slots 50. This phenomenon derives from the difference of permeance between the stator core 42 and the rotor core 62 and permeance between the stator slot 50 and the stator teeth 52. This is because magnetomotive force changes in a step-like condition that corresponds to the stator slot 50 because a stator winding 44 is disposed inside the stator slot 50.

The distribution of instantaneous magnetic flux in the gap δ at one point of time shows that harmonic pulsation magnetic flux φ0 superposes on sine-wave like fundamental wave component φb. Because a stator winding 44 is incorporated in a stator slot 50 of the stator core 42, harmonic pulsation magnetic flux φ0 is high at a portion that corresponds to the stator tooth 52 and decreases at a portion that corresponds to the stator slot 50.

Figure 8:
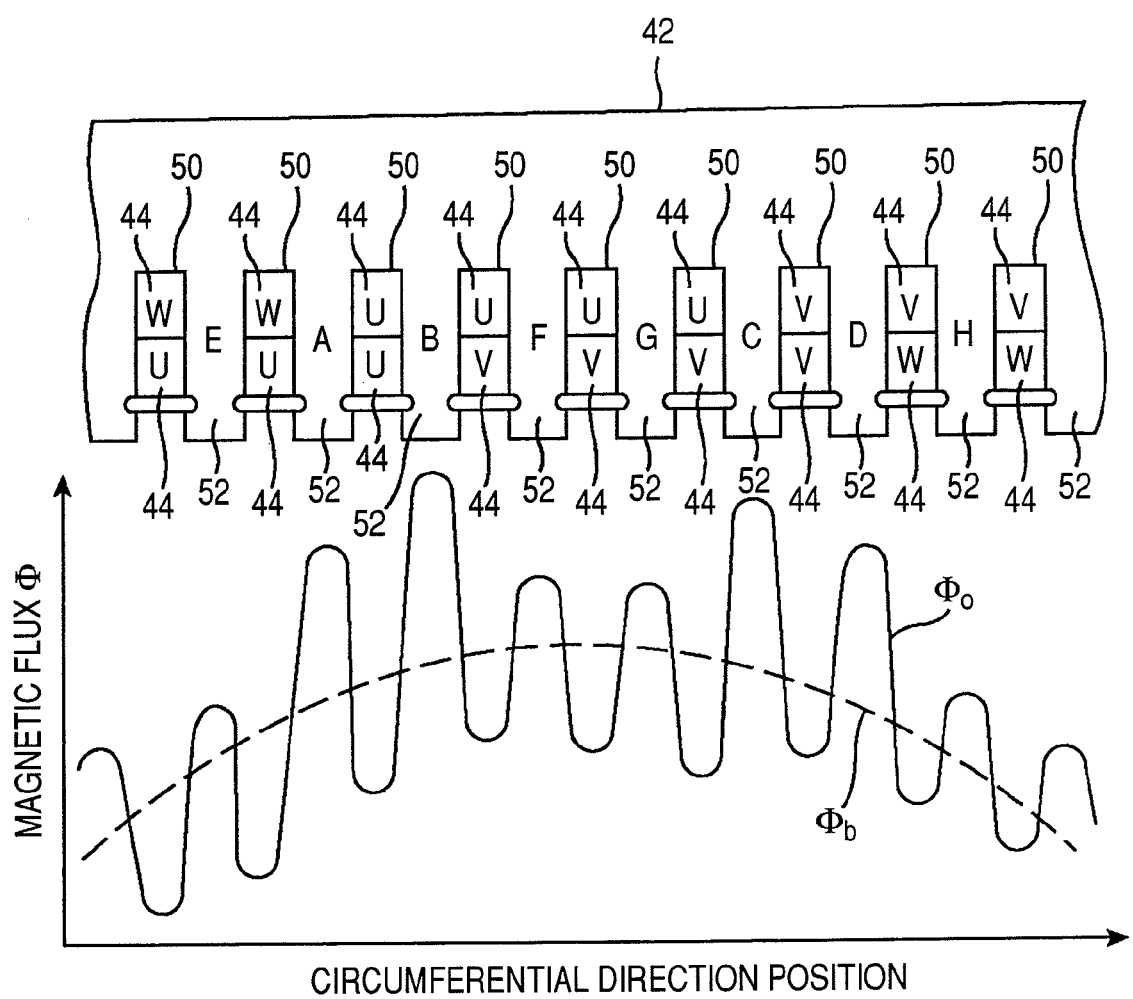
FIG. 8 shows the change of magnetic flux in the gap between the stator and the rotor.

Therefore, the distribution of magnetic flux in the gap δ between the stator and the rotor changes, as shown in FIG. 8, in response to the stator teeth 52 and the stator slots 50 of the stator core 42.

By closely observing the harmonic pulsation magnetic flux φ0, it was found that the value always becomes large at specific stator teeth 52 and it appears periodically.

That is, experiments revealed that the magnitude of magnetic flux of each stator tooth 52 differs according to each stator tooth 52 and harmonic pulsation magnetic flux φ0 becomes large in a specific cycle.

In FIG. 8, a stator winding 44 with "U" written is a U-phase winding, a stator winding 44 with "V" written is a V-phase winding, and a stator winding 44 with "W" written is a W-phase winding. Harmonic pulsation magnetic flux φ0 becomes large at a portion where the phases of current that flows through stator windings 44 incorporated in adjacent stator slots 50 are different from each other. That is, among the stator teeth 52, with regard to the stator tooth with "A" written, W-phase and U-phase stator windings are disposed in the stator slot 50 located on the left of the stator tooth "A" and U-phase and U-phase stator windings are disposed in the stator slot 50 located on the right of the stator tooth "A". Herein, current phases of adjacent stator windings are different.

Positions "B," "C," and "D" of the stator teeth 52 are in the same condition, and current phases of adjacent stator windings are different with each other.

On the contrary, with respect to position "E" of the stator teeth 52 of the stator core 42, W-phase and U-phase stator windings are disposed in the stator slot 50 located on the right of the position "E" and W-phase and U-phase stator windings are also disposed in the stator slot 50 located on the left of the position "E." Thus, current phases of adjacent stator windings are the same.

Similarly, with respect to positions "F," "G," and "H" of the stator teeth 52, current phases of stator windings 44 created in adjacent stator slots 50 are the same. Harmonic pulsation magnetic flux φ0 in the gap δ that corresponds to those positions of the stator teeth is small.

FIG. 8 shows an example of a three-phase, two-layer, short pitch, stator winding. In experiments, the same phenomenon was observed with respect to a three-phase, one layer, short pitch, stator winding.

That is, when current phases of adjacent stator windings 44 are different, harmonic pulsation magnetic flux φ0 becomes large partially. And, at a portion that corresponds to the position of the stator teeth where current phases of adjacent stator windings 44 are the same, harmonic pulsation magnetic flux φ0 is small.

This surface loss cannot be ignored in the circumstances like nowadays when efficiency is extremely important. Also, these days, even if a rotating electrical machine is used as a motor or as a generator, it is used at a high rotation speed. Furthermore, maximum rotation speed in the driving range to be used is extremely high; it exceeds 4000 rpm, and in some cases, over 10,000 rpm. Reducing the above-mentioned surface loss in such use conditions will result in further reduction of iron loss described in FIG. 5 and FIG. 6.

Moreover, an excellent effect of noise reduction will also result.

Figure 9:
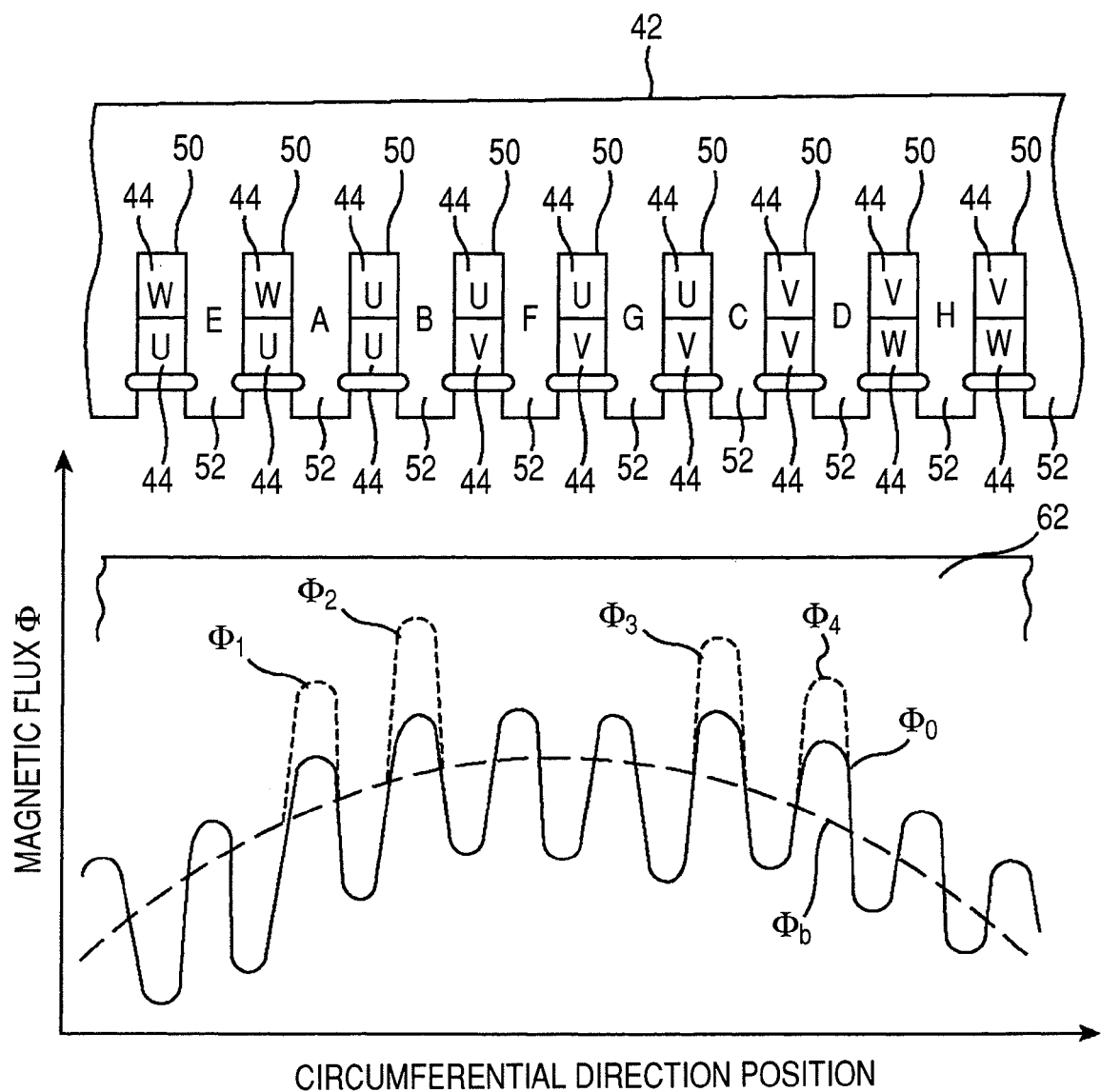
FIG. 9 shows the improved change of magnetic flux in the gap between the stator and the rotor.

FIG. 9 shows an embodiment that can reduce surface loss described in FIG. 7 and FIG. 8 in addition to the reduction of iron loss by etching thin electromagnetic steel sheets described in FIG. 5 and FIG. 6

That is, by using highly accurate etching characteristic which is impossible by punching work, the gap δ between the stator core 42 and the opposed rotor core 62 can be changed.

In the following embodiment, the size of the gap δ is changed by etching in the direction that eliminates pulsation of magnetic flux density generated according to the condition of the stator winding. For example, instead of making the shape of the stator teeth that face the rotor, which is the shape of the edge on the inner circumferential side, identical, the shape of the stator teeth is changed based on the conditions of the stator windings. By doing so, partial increase in harmonic pulsation magnetic flux φ0 that enters the rotor is inhibited, thereby making it possible to obtain excellent characteristic of an efficient multi-phase alternating current rotating electrical machine.

To reduce surface loss effectively, among the stator teeth 52, the length of the gap between a stator tooth 52, which is created at a position where current phases of stator windings 44 encased in the adjacent stator slots 50 are different, and the rotor is made larger than the length of the gap between the stator teeth 52, created at other locations, and the rotor.

Furthermore, to reduce surface loss more effectively, the length of the gap that corresponds to the stator tooth 52 located at a position where such current phases are different should be specified such that the amount of magnetic flux which runs through the stator tooth 52 approaches the amount of magnetic flux which runs through other stator teeth 52, and more specifically, it becomes almost the same as fundamental wave magnetic flux φb which indicates the amount of average magnetic flux.

Even if the value is not quite the same, by increasing the length of the gap with respect to some of those stator teeth that have high magnetic flux density, effects can be expected.

Furthermore, this embodiment will be described with reference to FIG. 9. A part that has the same number or symbol shown in other drawings indicates the same part and operates in the same manner.

The gap between the stator teeth "A," "B," "C," and "D," each of which is created at a position where phases of the current flowing through the stator windings 44 disposed in the stator slots 50 described in FIG. 8 are different, and the rotor core 62 that corresponds to those stator teeth is made greater than the gap between the stator teeth "E," "F," "G," and "H," each of which is created at a position where phases of the current flowing through the stator windings 44 disposed in the adjacent stator slots are the same, and the rotor core 62 that corresponds to the stator teeth 50.

By doing so, the amount of harmonic pulsation magnetic flux φ0 that enters the rotor core 62 from stator teeth "E," "F," "G," and "H" can become close to the amount of harmonic pulsation magnetic flux φ0 that enters the rotor core 62 from stator teeth "A," "B," "C," and "D."

Thus, by changing the length of the gap between the stator teeth 52 and the rotor core 62, it is possible to reduce harmonic pulsation magnetic flux φ0 which was high at specific stator teeth, thereby equalizing harmonic pulsation magnetic flux φ0 as shown in FIG. 9.

Conventionally, electromagnetic steel sheets were made by cutting, for example, by punching work in order to make a stator core and a rotor core; therefore, machining accuracy was poor and it was difficult to equalize harmonic pulsation magnetic flux φ0 by such machining processes. However, it is easy to adjust the gap between the stator teeth and the rotor core by an etching method. Furthermore, etching can reduce damage to the magnetic domain of electromagnetic steel sheets, thereby preventing loss of harmonic pulsation magnetic flux φ0.

As stated above, it is possible to prevent abnormal increase in surface loss, thereby making it possible to provide an efficient basket-type induction electric motor.

Experiments conducted by applying the technology described in this embodiment to a 1200 KW, 10-pole basket-type induction electric motor will be described.

The stator winding 44 is a three-phase, two-layer, short pitch winding as shown in FIG. 9. The cross-sectional area of each stator tooth 52 is the same. In the experiment in which gap δ between each stator tooth 52 and the rotor core 62 is equally set at 2 mm, surface loss of the rotor 60 is 13.8 kW and efficiency is 95.3%. On the contrary, in the experiment in which gap δ between a stator tooth 52, located at a position where phases of current flowing through stator windings 44 disposed in adjacent stator slots 50 are different, and the rotor core 62 is set at 2.7 mm, surface loss in the rotor 60 is reduced to 7.7 kW; accordingly, efficiency becomes 96%, which can increase efficiency by 0.7%.

In the embodiment shown in FIG. 9, gap δ between each stator tooth 52 and the rotor core 62 is, in other words, partially changed length of the stator teeth 52. Thus, by partially changing the length of the stator teeth 52, irregularity can be created on the inner circumference of the stator core, which may slightly increase windage loss and noise during operation depending on the model of the machine.

In that case, it is possible to align the appearing gap length of each stator tooth 52 by attaching a nonmagnetic member, for example, an electrical insulating member, to the tip of the stator tooth 52 which has the large gap length.

As stated above, in an embodiment shown in FIG. 9, among stator teeth 52 of the stator core 42, the length of the gap between a stator tooth 52, located at a position where phases of current flowing through the stator windings 44 encased in adjacent stator slots 50 are different, and a rotor is made greater than the length of gap between a stator tooth 52, located at a position where phases of current flowing through the stator windings 44 encased in adjacent stator slots 50 are the same or almost the same, and a rotor. By doing so, the amount of magnetic flux that runs through each stator tooth 52 becomes equal; consequently, it is possible to reduce surface loss in a rotor resulted from a partial increase in harmonic pulsation magnetic flux φ0. As a result, it is possible to further reduce iron loss than the amount of iron loss reduced by etching as described in FIG. 5 and FIG. 6; consequently, efficiency in the basket-type induction electric motor can be increased.

Figure 10:
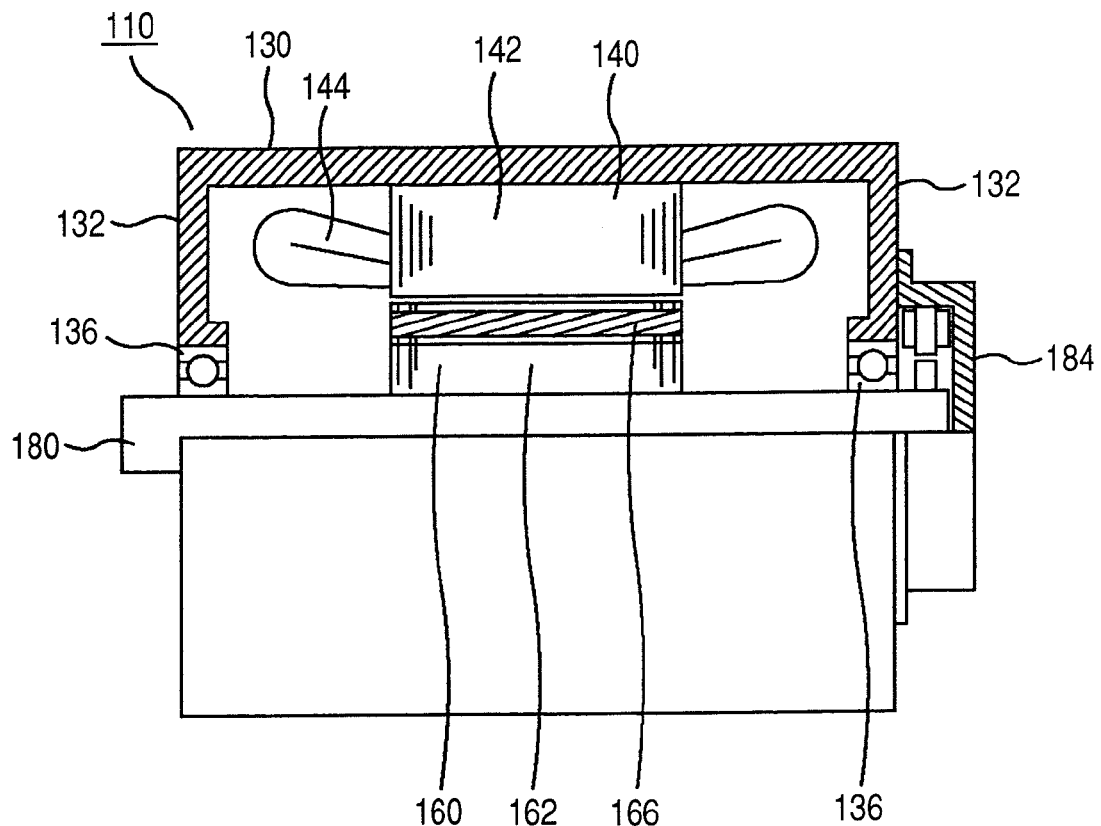
FIG. 10 shows the cross section along the rotational axis of a permanent-magnet motor.

FIG. 10 is a cross sectional view of a synchronous rotating electrical machine, such as a synchronous motor or a synchronous generator that uses permanent magnets, viewed along the rotational axis.

Figure 11:
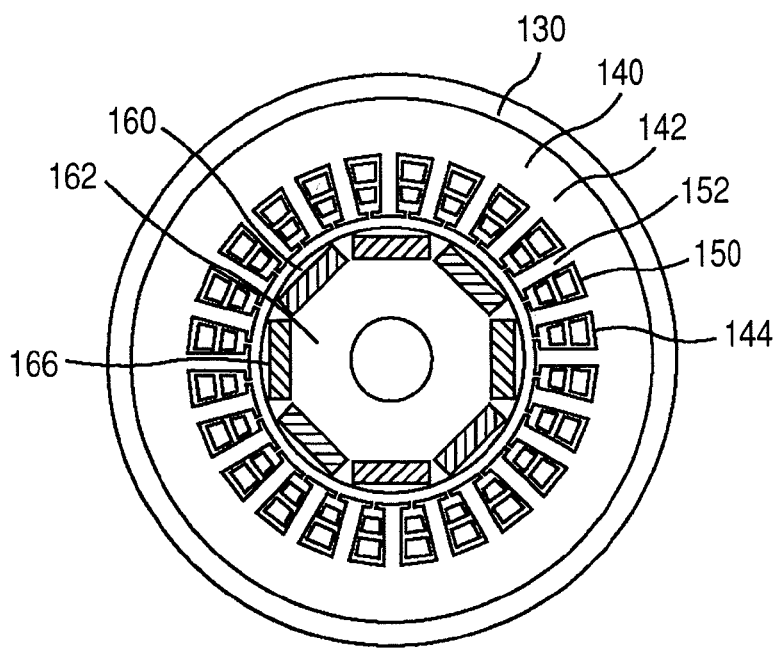
FIG. 11 shows the cross section vertical to the rotational axis of the stator and the rotor of a permanent-magnet motor.

FIG. 11 is a cross sectional view of a stator and a rotor viewed vertically to the rotational axis.

Figure 12:
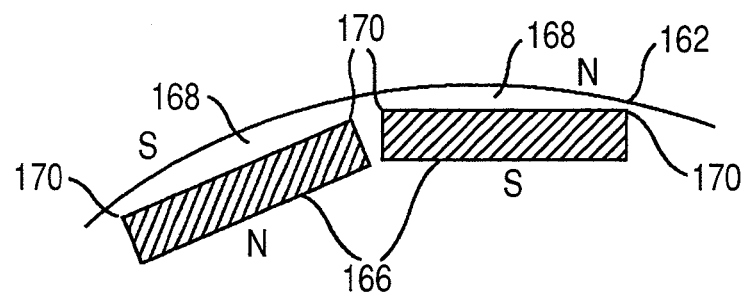
FIG. 12 shows the partially enlarged cross section vertical to the rotational axis of the rotor of the permanent-magnet motor.

Furthermore, FIG. 12 is a partially enlarged view of a rotor shown in FIG. 11.

A stator 140 is mounted inside the housing 130 that has end brackets 132 on both sides. The stator 140 comprises a stator core 142 having stator teeth 152 and stator slots 150, and stator windings 144 disposed in the stator slots 150.

The stator winding 144 shown in FIG. 10 and FIG. 11 is an example of distributed winding.

A rotor 160 is disposed so that it faces the stator core 142 with a gap interposed, and the rotor 160 is mounted to the shaft 180. The shaft 180 is rotatably supported by the end brackets 132 by means of bearings 136 disposed on both sides.

The rotor 160 has a rotor core 162 and permanent magnets 166. In this embodiment, magnet loading ports are created inside the rotor core 162, and a permanent magnet 166 is disposed in each magnet loading port.

The permanent magnet 166 has been magnetized so that the side of the magnet which faces the stator 140 is N pole or S pole, and the polarity of each permanent magnet is alternately opposite to each pole of the rotor 160.

In an embodiment shown in FIG. 11, a rotor 160 is has 8 poles, and each pole is made of one permanent magnet 166. Permanent magnets 166 are disposed at equal angle on the circumference of the shaft 180. Furthermore, each permanent magnet 166 is magnetized so that it becomes antipolarity alternately.

The rotor 160 is not intended to be limited to an 8-pole rotor, it can have 10 poles or more, and it can also have 6 poles or 4 poles.

Each pole can be made of one permanent magnet, or can be made of two or three or more magnets. When the pole is made by using two or three magnets, permanent magnets should be disposed so that magnetization polarity is reversed every two or three magnets.

In FIG. 10, a synchronous rotating electrical machine 110 has a sensor 184 that detects a rotation position of the rotor 160 and outputs a signal that indicates the position of the pole of the rotor 160. The sensor 184 has, for example, a resolver or a hall element.

According to the output from the sensor 184, three-phase alternating current based on the position of the pole of the rotor 160 is generated by an inverter device, not shown, and supplied to the stator windings 144.

Three-phase alternating current causes the stator 140 to generate a rotating magnetic field, and magnetic flux based on the rotating magnetic field acts on the rotor 160. Due to permanent magnets 166 and the rotating magnetic field that the rotor 160 has, a rotating torque is generated on the rotor 160. By outputting the rotating torque, a synchronous rotating electrical machine 110 operates as a rotating electric motor.

Furthermore, by adding an external rotating torque to the rotor 140, alternating-current power is generated in the stator winding 144. By outputting the alternating-current power as alternating current or direct current via a rectifier circuit comprising an inverter or diode, not shown, a synchronous rotating electrical machine 110 operates as a generator.

FIG. 12 is a partially enlarged view of a rotor 160, and permanent magnets 166 are embedded in the rotor core 162. The rotor core 162 has magnet loading ports inside, and a permanent magnet 166 is disposed in each magnet loading port.

The magnetization direction of the permanent magnets 166 is opposite to each pole. Permanent magnets are magnetized so that when the side of the permanent magnet opposed to the stator is N-pole, the side of the permanent magnets located on both sides of that magnet opposed to the stator are S-pole.

The rotor core 162 opposed to the stator of the permanent magnet 166 partially acts as a pole piece 168, and via this pole piece 168, a magnetic circuit is created between the rotor and the stator. Magnetic flux of the permanent magnet 166 is supplied to the stator via the magnetic circuit equipped with the pole piece 168 or magnetic flux is supplied from the stator to the permanent magnet 166.

The face of the permanent magnets that constitute adjacent poles in the rotor and are opposed to the stator has antipolarity. There is a possibility that magnetic flux leaks between the pole pieces 168 of the adjacent poles; therefore, a bridge portion 170 is provided to prevent magnetic flux from leaking between the rotor's adjacent poles.

In the bridge portion 170, the cross-sectional area where magnetic flux flows is limited, and by magnetically saturate this portion, magnetic flux is inhibited from leaking.

A rotating electrical machine described in this embodiment is, for example, a 50 kW class permanent magnet synchronous motor whose stator core's outer shape is about 190 mm and the shaft length is 130 mm.

An electromagnetic steel sheet, which is the same silicon steel sheet as described in FIG. 7 and FIG. 8, is used for a stator core and a rotor core, and the electromagnetic steel sheet is etched thereby creating a stator core steel sheet and a rotor core steel sheet. Then, those steel sheets are laminated thereby producing a stator core 142 and a rotor core 162.

The density of the laminated core, such as a stator core 142 and a rotor core 162, is about 98%. By reducing the thickness of each electromagnetic steel sheet, it is possible to reduce eddy-current loss.

Furthermore, by means of etching, it is possible to reduce damage to the magnetic domain of the electromagnetic steel sheet and inhibit the increase in hysteresis loss. Specifically, it is difficult to punch an electromagnetic steel sheet with a thickness of 0.2 mm or less, and damage to the magnetic domain increases.

On the contrary, etching workability of an electromagnetic steel sheet with a thickness of 0.2 mm or less, preferably between 0.08 mm and 0.2 mm can be improved, and also damage to the magnetic domain can be significantly reduced.

The efficiency in the motor that uses such electromagnetic steel sheets is about 90%, which is higher by about 6% than the efficiency in the motor that uses electromagnetic steel sheets created by punching a 0.35-mm thick electromagnetic steel sheet. This is because iron loss in the stator core has been reduced.

Figure 13:
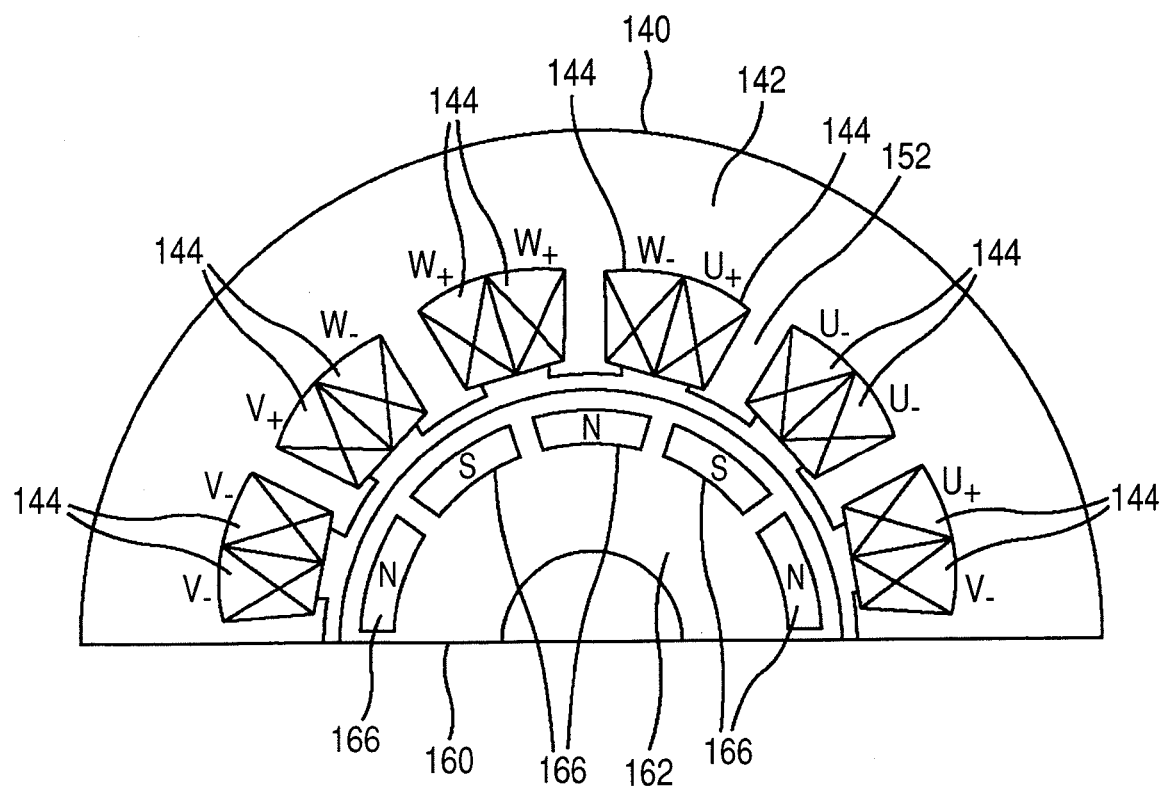
FIG. 13 shows the partial cross section of the permanent-magnet motor having curved permanent magnets.

FIG. 13 shows a synchronous rotating electrical machine described in FIG. 10, FIG. 11, and FIG. 12, and what is different from the embodiment described in FIG. 10, FIG. 11, and FIG. 12 is that the stator winding 144 is a concentrated winding and as shown in FIG. 13, the magnet is of a curved shape.

In FIG. 13, the part that has the same number or symbol shown in FIG. 10, FIG. 11, and FIG. 12 indicates the same part that operates in the same manner.

Basically, a synchronous rotating electrical machine shown in FIG. 13 has the same configuration as a synchronous rotating electrical machine shown in FIG. 10. Unlike the stator winding 144, a distributed winding as shown in FIG. 11, arrangement of the stator winding 144 disposed in the stator slot of the stator core 142 is different; a concentrated winding.

The stator winding 144 can be either a distributed winding or a concentrated winding, and either can apply to this embodiment.

The rotor 160 shown in FIG. 13 has 10 poles, however, it is not intended to be limited to 10 poles. Both many and few poles are accepted. Furthermore, each pole of the rotor 160 has one permanent magnet 166, but each can have a plurality of permanent magnets.

In this embodiment, curved magnet loading ports are created in the rotor core 162, and a curve-shaped magnet is inserted in each port. As described in FIG. 11, magnetic flux comes in and goes out from the face of the magnet opposed to the stator.

It is preferable that the magnet face have a curved shape when almost the same magnetic flux per unit area of the magnet face comes in and goes out.

However, it is difficult to punch a curved magnet loading port on an electromagnetic steel sheet. Therefore, conventionally, a rectangle magnet loading port is provided.

In this embodiment, because the magnet loading port is created by etching, it is possible to easily and accurately create a curved magnet loading port. When using a punching method, there is also a problem in that damage to the magnetic domain is severe during the process to create a magnet loading port, resulting the increase in hysteresis loss.

Thus, it is possible to reduce damage to the magnetic domain by using an etching method, therefore, it is possible to provide a synchronous rotating electrical machine which is more efficient than the embodiment described in FIG. 10, FIG. 11, and FIG. 12.

In the embodiment described in FIG. 10, FIG. 11, FIG. 12, and FIG. 13, eddy-current loss can be reduced. Therefore, it is possible to suppress eddy current in the stator core and the rotor core during high-speed rotation in a high-speed rotating electrical machine, thereby reducing iron loss.

Effects can be expected when maximum rotation speed of a rotor during operation is 4000 rpm or more.

Effects can be expected in a rotating electrical machine whose rotor's maximum rotation speed is 4000 rpm or more and 6000 rpm or less.

If the technical concept obtained from the this embodiment is applied to a rotating electrical machine that is associated with the rotor having a maximum rotation speed which is set above 6,000 up to 10,000 rpm, greater effect can be expected.

Furthermore, if the technical concept of this embodiment is applied to a rotating electrical machine that rotates by means of short-circuit rings at the maximum rotation speed of the rotor, great effect can be expected. In addition, if the technical concept of this embodiment is applied to a rotating electrical machine that is associated with the rotor having a maximum rotation speed which is set above 10,000 up to 100,000 rpm, greater effect can be expected.

The embodiment described in FIG. 10, FIG. 11, FIG. 12, and FIG. 13 is a rotating electrical machine structured such that magnets are inserted into the rotor core. However, it is possible to use electromagnetic steel sheets described in FIG. 5 and FIG. 6 in a rotating electrical machine structured such that magnets are disposed on the surface of the rotor. As a result, in the same manner, eddy-current loss and hysteresis loss can be reduced, thereby making it possible to provide a rotating electrical machine that can reduce iron loss.

The present invention can be used as a rotating electrical machine, such as a rotating electric motor or a generator.

What is claimed is:

1. A rotating electrical machine comprising
a stator and a rotor;
said stator comprising a stator core having teeth and slots, and stator windings disposed in said slots, wherein
said stator core is made of laminated steel sheets,
teeth and slots of said steel sheet are made by etching,
the thickness of said steel sheet is between 0.05 mm and 0.30 mm, and
said steel sheet contains C being between 0.001% and 0.060% by weight, Mn being between 0.1% and 0.6% by weight, P being 0.03% or less by weight, S being 0.03% or less by weight, Cr being 0.1% or less by weight, Al being 0.8% or less by weight, Si being between 0.5% and 7.0% by weight, Cu being between 0.01% and 0.20% by weight, and the remaining components comprising unavoidable impurities and Fe.

2. The rotating electrical machine according to claim 1 wherein
said rotor has permanent magnets.

3. The rotating electrical machine according to claim 1 wherein
alternating current flowing through said stator winding generates a rotating torque thereby rotating said rotor.

4. The rotating electrical machine according to claim 1 wherein
an external rotating torque rotates said rotor thereby inducing alternating-current power in said stator winding, and then alternating current is outputted from said stator winding.

5. The rotating electrical machine according to claim 1 wherein
said steel sheet is a silicon steel sheet.

6. The rotating electrical machine according to claim 1 wherein
said steel sheet contains crystalline particles.

7. The rotating electrical machine according to claim 1 wherein
said stator core has an insulation film with a thickness between 0.01 μm and 0.02 μm located between the laminated steel sheets.

8. The rotating electrical machine according to claim 1 wherein
the thickness of said insulation film is between 0.1 μm and 0.2 μm.

9. The rotating electrical machine according to claim 1 wherein
said insulation film is an oxide film with a thickness between 0.01 μm and 0.05 μm.

10. The rotating electrical machine according to claim 5 wherein
the silicon concentration in said silicon steel sheet is between 0.8% and 2.0% by weight.

11. The rotating electrical machine according to claim 5 wherein
the silicon concentration in said silicon steel sheet is between 4.5% and 6.5% by weight.

12. The rotating electrical machine according to claim 5 wherein
the silicon concentration in said silicon steel sheet is higher in the surface portion than the inside of the sheet.

13. The rotating electrical machine according to claim 1 wherein
the diameter of said stator core is between 5 mm and 300 mm, and maximum output is 200 kW or less.

14. The rotating electrical machine according to claim 1 wherein
maximum rotation speed of said rotor is between 4000 rpm and 6000 rpm, and silicon contained in said steel sheet, which is a silicon steel sheet, is distributed in the thickness direction of said steel sheet.

15. The rotating electrical machine according to claim 1 wherein
maximum rotation speed of said rotor is between 10,000 rpm and 100,000 rpm, and concentration of silicon contained in said steel sheet, which is a silicon steel sheet, is higher in the surface portion than the inside of the sheet.

* * * * *